United States Patent [19]

Masters

[11] Patent Number: 4,572,061
[45] Date of Patent: Feb. 25, 1986

[54] HEATING FOOD ARTICLES

[75] Inventor: Adrian G. Masters, Maidenhead, England

[73] Assignee: United Biscuits (UK) Limited, Edinburgh

[21] Appl. No.: 559,230

[22] Filed: Dec. 8, 1983

[30] Foreign Application Priority Data

Dec. 10, 1982 [GB] United Kingdom ............... 8235277

[51] Int. Cl.⁴ .............................................. A47J 37/04
[52] U.S. Cl. ........................................ 99/331; 99/386;
99/389; 99/400; 99/401; 99/446; 99/447;
126/21 A; 219/400
[58] Field of Search ................ 99/325, 331, 386, 389,
99/400, 401, 339, 446, 447; 426/520, 523;
126/21 A; 219/400

[56] References Cited

U.S. PATENT DOCUMENTS

| 3,088,396 | 5/1963 | Proffitt ............................. 99/446 X |
| 3,623,423 | 11/1971 | Berger ................................. 99/446 |
| 3,712,819 | 1/1973 | Field ................................ 99/446 X |
| 3,738,256 | 6/1973 | Joeckel ............................ 99/446 X |
| 3,757,671 | 9/1973 | Warshauer et al. ............. 99/446 X |
| 4,188,866 | 2/1980 | Baker et al. ..................... 99/446 X |
| 4,335,705 | 6/1982 | Kiyomitu .......................... 99/446 X |
| 4,421,015 | 12/1983 | Masters et al. .................. 99/400 X |

*Primary Examiner*—Billy J. Wilhite
*Attorney, Agent, or Firm*—Seidel, Gonda, Goldhammer & Abbott

[57] ABSTRACT

Food articles tending to exclude fat are heated in cooking apparatus provided with a floor removable for cleaning and of double-walled construction so that cooling air can be blown through to reduce or eliminate the risk that fat collected on the floor will ignite. The air flow is controlled so as to occur only when the floor temperature is above a predetermined level.

17 Claims, 9 Drawing Figures

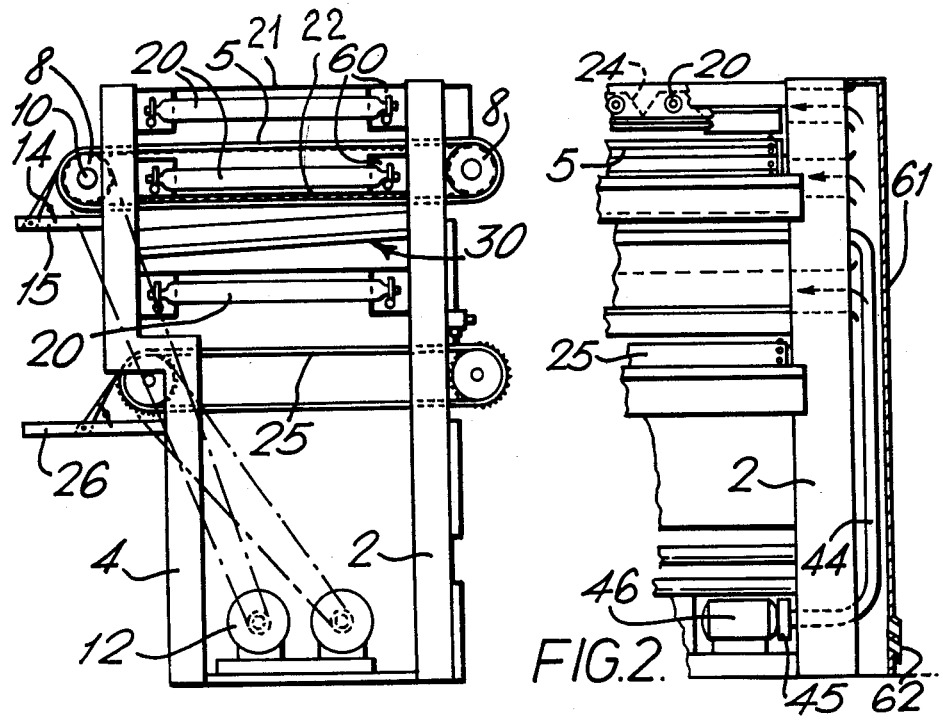
FIG.1.
FIG.2.
FIG.3.
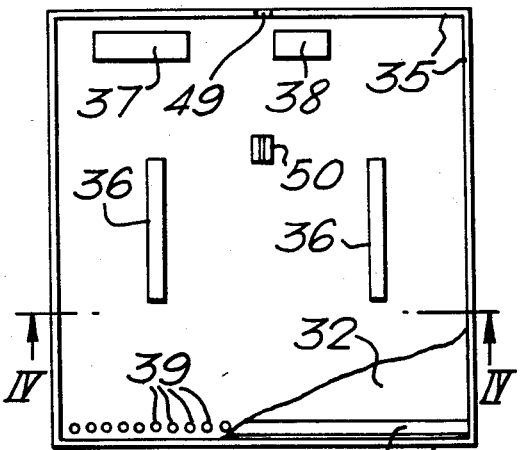
FIG.4.
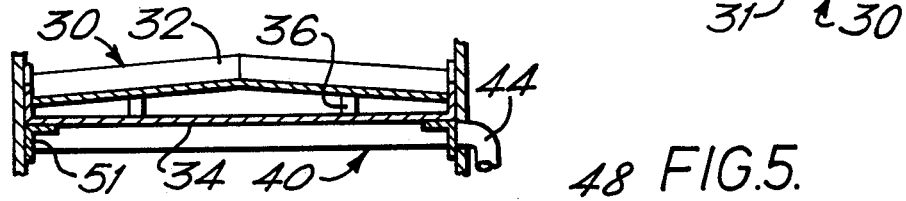
FIG.5.
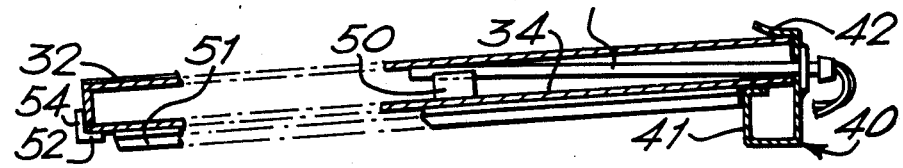

HEATING FOOD ARTICLES

BACKGROUND OF THE INVENTION

The invention relates to the heating of food articles.

Cooking apparatus for foodstuffs which exude fat is subject to what is known as "flaming", that is, ignition of the exuded fat, which occurs when the temperature of the exuded fat rises to a certain level. For example, during the cooking of hamburgers the exudate is liable to ignite at a temperature typically of the order of 370°–380° C. Flaming can of course be prevented by the use of cooking temperatures below the flaming level, and it is advantageous to use near infrared heating sources because the surface temperature of the radiators need be no more than about 250° C. However, there are circumstances in which high temperature heat sources are employed, and when short cooking times are required, heat of considerable intensity has to be applied, even though infrared radiation sources are used, so that flaming occurs because of the temperature reached by parts of the cooking chamber on which fat has accumulated.

The invention accordingly has as an object the provision of a food heating method and apparatus whereby flaming is reduced or eliminated.

SUMMARY OF THE INVENTION

The invention accordingly provides a food heating method and apparatus in which the lower region of a food heating chamber is arranged to be swept on its underside by a cooling airflow.

Fats exuded by food articles being heated in a heating chamber necessarily collect on the floor or lower part of the chamber, so this floor or lower part is cooled to a temperature below the flaming temperature in accordance with the invention. The airflow can be guided between the floor and a lower floor of the apparatus or an underfloor on which the apparatus stands, but the floor is conveniently the upper wall of a double walled drip-collecting tray, the airflow being confined between the walls. The air cooled floor is preferably inclined or shaped so that the fats, hot enough to be liquid, flow into a collecting region or sump, not necesssarily incorporated in the wall, to facilitate removal.

The floor is advantageously readily removable and replaceable for cleaning. Where the floor is provided by a double walled structure, the whole structure is preferably removable, as otherwise a seal must be re-established around the entire periphery of the floor when it is replaced whereas the double walled structure needs merely to be re-connected to the cooling air supply.

The cooling air flow can be induced in any suitable way and can be directed also to the cooling of other parts of the apparatus which are liable to reach excessive temperatures at which "flaming" could occur. For example, if the apparatus includes a conveyor on which food items are carried beneath or between radiant heaters, cooling air can be applied to the conveyor at a positon immediately downstream of that at which the cooked food items are discharged or to the guide surfaces by which the conveyor is guided between its upper and lower runs. If the apparatus incorporates heating elements such as infra-red heating tubes, the ends of which require to be cooled by an air flow when the tubes are in operation, the source of the air flow can be employed to provide cooling air also for such other parts of the apparatus.

If the air flow is provided by an impeller, driven for example by an electric motor, the motor is preferably located remotely from the floor to minimise heat transfer between the motor and the cooking chamber. It is of course uneconomic to remove heat from the cooking chamber whatever its temperature and preferably the airflow is operative only when a predetermined temperature, near to the "flaming" temperature, is reached. The flow can thus be associated with a temperature sensing means controlling operation of the impeller through a thermostat. If near infra-red heating sources are used, the cooling air must be supplied to these regardless of the cooking chamber temperature so it is convenient to provide two separately operable cooling systems.

BRIEF DESCRIPTION OF THE DRAWINGS

FIG. 1 is a schematic side view of a cooking apparatus embodying the invention, with certain parts omitted;

FIG. 2 is a partial schematic front view of the apparatus of FIG. 1, again with parts omitted;

FIG. 3 is a plan view of a drip tray included in the apparatus of FIGS. 1 and 2, partly broken away to show a lower plate thereof;

FIG. 4 is a sectional front view taken on the line IV—IV of FIG. 3, but showing the drip tray in place within the cooking apparatus;

FIG. 5 is a sectional fragmentary side view of a detail of the drip tray in place in the apparatus;

Figure 6:
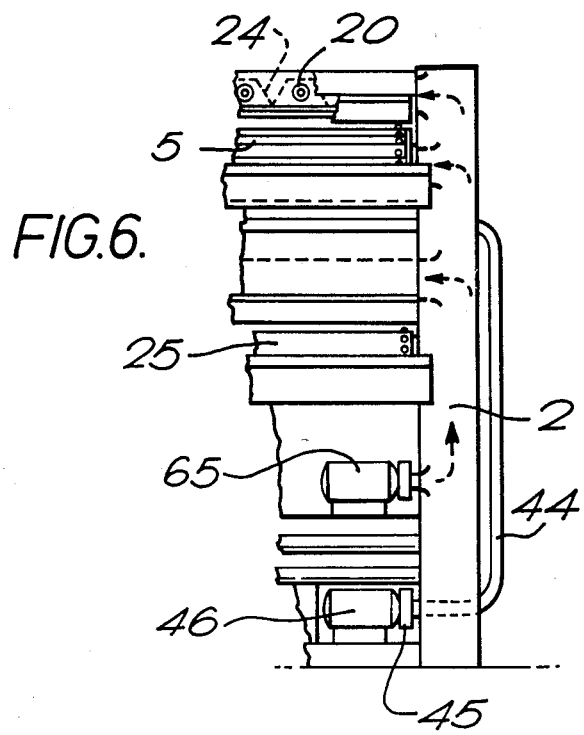
FIG. 6 is a view similar to FIG. 2 of a modified cooking apparatus.

Referring now to the drawings, the illustrated cooking apparatus comprises a frame including tubular support pillars, for example, of stainless steel. The frame has two front pillars 2 and two rear pillars 4. At the upper part of the apparatus, side panels define a heating chamber through which runs a hamburger conveyor with a belt 5. The belt 5 is of ladder construction, that is, it comprises transversely extending bars joined to flexible links at their ends, the links forming a chain engaged by sprockets 8 at the front and the rear of the apparatus between which upper and lower runs of the belt extend horizontally through the frame. Between each pair of sprockets 8, a guide element presents a profiled surface over which the transverse bars of the belt 5 are guided. The rear sprockets 8 are on a common spindle 10 driven by an electric motor 12 located at the base of the frame through a chain drive. At the rear of the apparatus, a doctor blade 14 is lightly biassed against the belt 5 to guide cooked hamburgers which have been passed through the apparatus on the upper run of the belt onto a delivery shelf 15.

The cooking of hamburgers on the upper run of the conveyor belt 5 is effected by an upper bank of near infrared radiation sources above the upper run and by a lower bank of like sources located beneath the upper run, between it and the lower run. Each source comprises an elongate envelope or tube 20 of quartz containing a resistive element capable of emitting radiation preferably concentrated in the near infrared wavelength range for example between 1.5 $\mu$m to 0.72 $\mu$m. The two banks of the tubes 20 are mounted in respective racks 21 and 22, so that the tubes extend longitudinally of the path of travel of the hamburgers on the conveyor. Each bank of the tubes 20 is backed by a reflector 24, of aluminium or other highly reflective metal surface, so that the near infrared radiation from the tubes is directed onto the upper runs of the belts.

Below the belt 5 the frame mounts a lower conveyor with a belt 25, of a similar configuration to that of the belt 5, for heating bun halves. The belt 25 is associated with drive arrangements similar to those of the belt 5 but is of light construction, for example, a light gauge wire web, or of Teflon coated glass fibre material. Above the upper run of the belt 25 is mounted a third rack mounting a bank of the tubes 20 for heating bun halves on the upper run of the belt. No initial searing of the bun halves is required and such searing is avoided because the material for the belt is such as not to retain much heat. A second shelf 26 is provided at the rear of the apparatus for receiving hamburger buns after they have been heated on the belt 25.

Between the lower run of the belt 5 and the lowermost rack of tubes 20, the apparatus frame mounts a drip tray 30 for receiving fat exuded from the hamburgers during the cooking process, as readily occurs when the hamburgers are being cooked relatively quickly, for example, within a cooking time of two minutes. The drip tray 30 is generally rectangular and has an upper surface which slopes downwardly towards the rear of the machine for fat collection in a gulley 31 extending transversely across the machine at the lower rear end of the tray. To prevent ignition of fat collected on the tray because of the temperature to which the tray may be heated by the tubes 20, a cooling airflow beneath the exposed upper surface of the tray is provided.

For this purpose, the tray is constructed, for example of aluminium sheet material, from upper and lower plates 32,34 spaced apart to provide a duct through which the cooling air is caused to flow.

The upper plate 32 of the tray slopes down to the sides of the apparatus from a centre line, to bring the fat collected thereon beneath the tubes 20 at the sides and thus to prevent solidification before it reaches the gulley.

The lower plate 34 of the drip tray has a raised rim 35 around its edges to which the upper plate is secured. Spacers 36 extend between the upper and lower plates to maintain the spacing and to confer rigidity on the tray structure. The lower plate 34 is apertured at 37 and 38 at the front of the apparatus to receive an incoming airflow and is also apertured along the rear edge, as by slots or as shown by a row of small holes 39 through which the airflow escapes after traversing the space between the plates.

Air under pressure enters the drip tray through the apertures 37,38 from an elongate plenum chamber 40 extending horizontally across the front of the apparatus. To permit the drip tray to be removed for cleaning, its front edge is releasably engaged with the plenum chamber as best shown in FIG. 5. The chamber is generally rectangular in the cross-section and has a transverse slot, in the upper part of its rear wall 41, in which the drip tray, and the upper walls 32 is turned outwardly at the upper edge of the slot to provide a guide for the drip tray during replacement, and to resiliently engage upper plate 32 to make an adequate seal.

The apertures 37,38 in the drip tray lower plate are thus received within the plenum chamber 40, into one end of which air is blown from an impeller 45 driven by an electric motor 46 at the base of the frame by way of a tube 44 extending upwardly from the impeller, or by way of the interior of one of the pillars 2. The location of the motor prevents the transfer of heat from the motor to the cooking chamber. The apertures 37 and 38 are positioned and dimensioned so that a generally uniform flow of air from front to back of the drip tray is obtained or so that a desired distribution of the air flow is obtained for example to take into account different cooking operations conducted at the two sides of the apparatus. In the apparatus illustrated, the aperture 38 nearer the inlet end of the plenum chamber is of smaller area than the other.

The electric motor 46 is preferably not operated continuously during use of the apparatus to avoid wasteful withdrawal of heat from the cooking chamber at temperatures below that at which flaming becomes a risk. Motor operation is therefore controlled in accordance with the temperature of the drip tray 30, in particular, that of the upper plate 32. Preferably, the motor 46 is energised only when a temperature approaching 370° C., for example 350° C. is reached. Control is effected by a thermostat device including an elongate probe 48 which extends through the upper part of the front wall of the plenum chamber 40 and into the interior of the drip tray through an aperture 49 in the drip tray rim 35. The sensitive element of the probe is at its free end, and to ensure that this is engaged with the under surface of the drip tray top plate, a block 50 provided with an inclined V-shaped upper surface is secured to the drip tray lower plate. As will be clear from FIG. 5, the drip tray can be installed within the apparatus after cleaning by movement towards the front of the apparatus, towards the end of which movement the end of the probe 48 will be received in the groove of the block 50, so that when the movement is concluded, the probe end is brought into firm contact with the top plate underside.

Alternatively, the probe 48 is permanently secured to the underside of the plate 32 or received in a suitable guide fitting extending through an aperture the plate to its upperside. The probe is then electrically connected to a plug also secured to the tray and receivable in a socket carried by the frame.

The drip tray 30 is supported along its side edges by brackets 51 and at its rear edge by a bracket 52 which provides a lip 54 to restrain the drip tray against withdrawal movement, and over which it can be lifted when withdrawal is required.

Each of the racks mounting the tubes 20 includes a duct 60 at the front and another at the rear, into which the ends of the tubes 20 extend. As schematically shown in FIG. 2, cooling air from a second cooling air system is passed through the ducts 60. At least the side panel 61 of the apparatus is of double-wall constructions, and an electrically driven impeller (not shown) is positioned within the side panel to draw in ambient air through louvres 62 at the foot of the apparatus and to impel it upwardly within the panel for distribution laterally through the ducts 60. The tube 44 is accommodated within this panel 61. After passage along the ducts 60, the air escapes at the other side of the apparatus, having collected heat from the ends of the tubes 20 in particular and cooling the apparatus as a whole. Because the tubes 20 must always be cooled when in operation, the second cooling system is continuously operated as long as a main control switch is closed to supply power to the tubes.

Instead of the double-wall construction for the side panel 61, this and the other side panels defining the heating chamber can be of single wall construction of aluminium panels for example, and the air supply to the ducts 60 is then carried through one or more of the support pillars 2,4. FIG. 6 of the drawing shows such a construction, in which an electrically driven impeller 65 of the second cooling air system impels cooling air into the front support pillar 2 and thence into the ducts 60.

Figure 7:
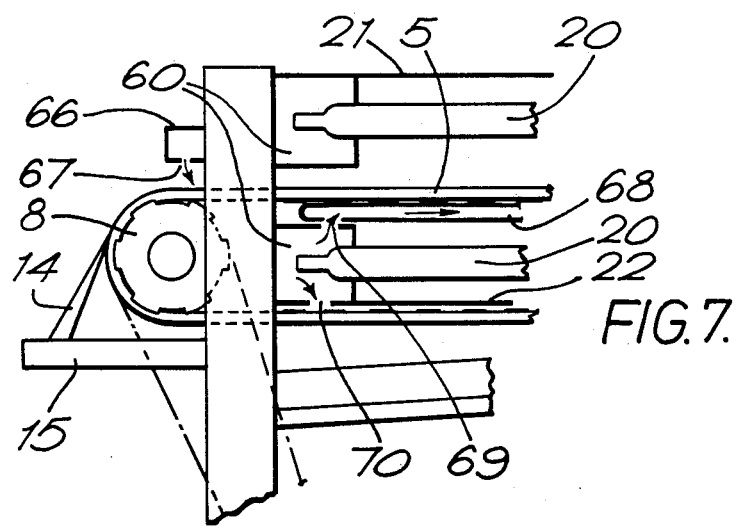
FIGS. 7 to 9 are views corresponding to a part of FIG. 1 of respective further modified items of cooking apparatus.
Figure 8:
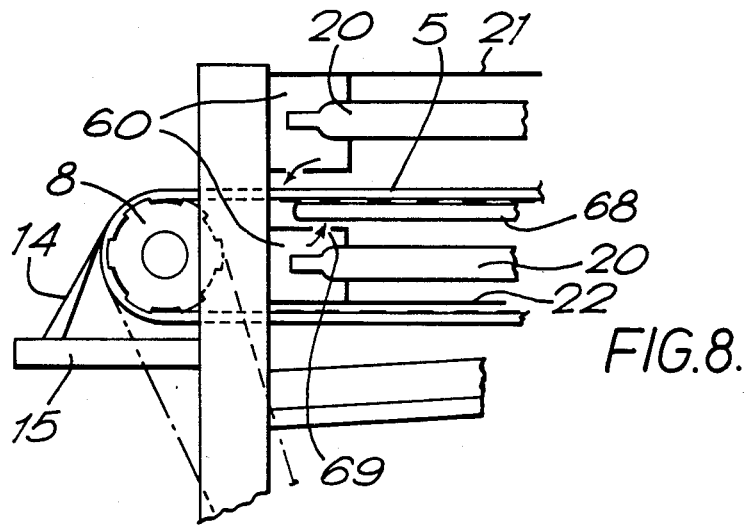
Figure 9:
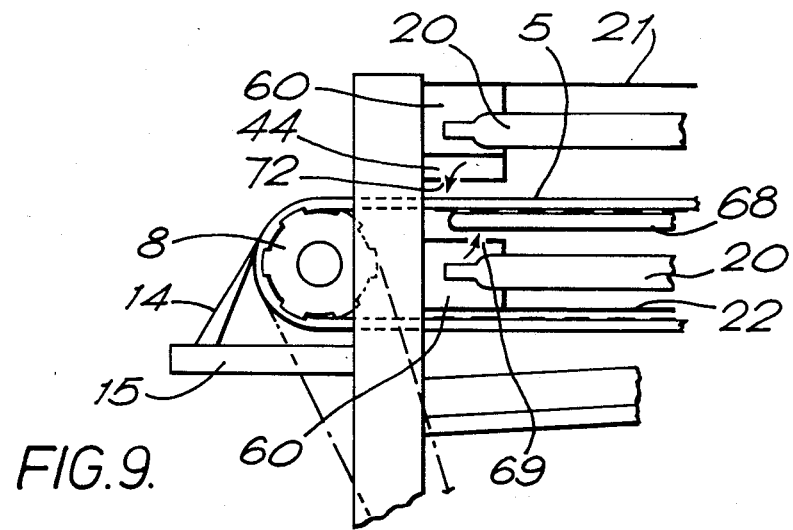

Additionally, provision can be made for application of cooling air to the outlet end region of the conveyor belt 5 at which the belt achieves its highest temperature. Thus, cooling air can be directed onto the portion of the belt 5 directly downstream of the sprockets 8 at the delivery end of the belt, that is, at the beginning of the lower run of the belt. Instead or as well air can be conveyed through the guide element for the transverse bars of the belt at this position, the element being constructed as a tube to receive an internal air flow for this purpose. This cooling air will enter the cooking chamber after flowing over the conveyor belt 5 but a small volume of air flow through the cooking chamber is advantageous and assists in reducing "flaming". FIG. 7 of the drawings shows a modified cooker in which an extension part 66 of the rear duct 60 of the uppermost tubes 20 has an apperture 67 through which cooling air is directed onto the upper run of the conveyor belt 5 adjacent to its delivery end. The rear duct 60 of the middle bank of tubes 20 has an outlet 69 at each end, through which cooling air is fed to tubular lateral guides 68 for the transverse bars of the belt 5. A further outlet 70 directs cooling air onto the belt at the beginning of its lower run. The air supply for cooling the conveyor belt 5 and/or the exterior of the the associated guide element can be supplied from a third supply source controlled by a suitably positioned thermostat or operated throughout use of the apparatus. Instead as shown in FIG. 8 of the drawings cooling air can be directed to the belt and/or guide element from the ducts 60. It may however be preferred to supply the cooling air to the conveyor belt and/or the guide element from the first system, to avoid the introduction of cool air into the cooking chamber before this has reached the temperature at which the thermostat device effects operation of the motor 46. FIG. 9 of the drawings shows such a construction, in which a portion of the duct 44 extends beneath the duct 60 of the uppermost tubes 20 and has an inlet port 72 for air cooling the upper run of the belt 5 adjacent to its delivery end.

For further particulars of the illustrated cooling apparatus, for example, as regards control and operations, and also for other forms of cooling apparatus in which the present invention can be embodied reference may be made to European Patent Publication No. 0 040 528 issued Nov. 26, 1981, the disclosure of which is incorporated herein by reference.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Apparatus for heating food articles, said apparatus comprising:
   means defining a heating chamber to receive a food article therein, said means including floor means located beneath said food article;
   means for heating the interior of said heating chamber,
   means to heat a food article received therein;
   impeller means for inducing a cooling air flow beneath said floor means;
   means for sensing the temperature of said floor means; and
   control means controlling operation of said impeller means in response to said sensed temperature.

2. The apparatus of claim 1 wherein said sensing means comprises a sensor in contact with the underside of said floor means.

3. The apparatus of claim 1 wherein said control means is adapted to energize said motor driven impeller means only in response to a sensed floor means temperature above about 350° C.

4. The apparatus of claim 1 having means supporting said floor means in said apparatus, said supporting means permitting ready removal and replacement of said floor means.

5. The apparatus of claim 1 wherein said floor means comprises upper plate means of which the upper surface in part defines said chamber and lower plate means spaced from said upper plate means, said lower plate means providing a lower boundary for said cooling air flow.

6. The apparatus of claim 5 wherein said upper and said lower plate means together comprise drip tray means received in said apparatus so as to be readily removable from and replaceable in said apparatus.

7. The apparatus of claim 5 wherein said floor means further comprises air inlet means and air outlet means, said air inlet means and said air outlet means being adapted to provide a generally uniform air flow over the area of said floor means.

8. The apparatus of claim 1 further comprising means for directing said cooling air flow also to other parts of said apparatus.

9. The apparatus of claim 8 further comprising conveyor means for conveying food articles in succession through said heating chamber, said cooling air being directed onto said conveyor means.

10. The apparatus of claim 1 wherein said heating means comprises source means of radiation of wave length between 1.5 $\mu$m and 0.72 $\mu$m.

11. An apparatus for heating food articles, said apparatus comprising:
    means defining a heating chamber for receiving a food article therein;
    means for supporting a food article to be heated in said heating chamber;
    heating means for such an article;
    removable drip tray means positioned beneath said supporting means to receive fat exuded by said food article, said drip tray means having a lower plate and; spaced therefrom to form a space therebetween, an upper plate having an upper surface which forms a floor of said heating chamber;
    impeller means for causing air to flow through said space; temperature sensing means; and
    control means responsive for said temperature sensing means to control said impeller means.

12. The apparatus of claim 11 wherein the temperature sensing means comprises a temperature sensor in contact with the underside of said upper plate.

13. The apparatus of claim 12 including a probe having a free end and which is secured at its other end to frame means of said apparatus, said temperature sensor being positioned adjacent said free end and said sensor coming into contact with said underside of said upper plate when said drip tray means is fitted to said apparatus.

14. The apparatus of claim 12 wherein said temperature sensor is secured to the underside of said upper plate and has connection means for a connection to be made to said control means, said connection means being capable of being made and remade to permit removal of said drip tray.

15. The apparatus of claim 11 wherein said upper surface of said upper plate is contoured to cause exuded fat to flow to a collection position.

16. The apparatus of claim 15 wherein said upper surface is shaped to guide fat exuded by a said food article to flow over regions of said upper surface where said fat receives heat from said heating means.

17. The apparatus of claim 15 wherein: the said collection position is in gully means defined by said upper surface adjacent one edge thereof; said upper surface has a center line which extends transversely to said gully means and from which said surface slopes downwardly to respective first and second further edge regions of said surface; and said upper surface also slopes downwardly towards said gully means in the direction of said line; and said heating means comprises portions lying above said and second further edge regions.

* * * * *

UNITED STATES PATENT AND TRADEMARK OFFICE
CERTIFICATE OF CORRECTION

PATENT NO. : 4,572,061

DATED : February 25, 1986

INVENTOR(S) : Adrian G. Masters

It is certified that error appears in the above-identified patent and that said Letters Patent is hereby corrected as shown below:

On the Title Page, Item /57/ line 1, "exclude" should read -- exude --.

Signed and Sealed this

Twenty-second Day of July 1986

[SEAL]

Attest:

Attesting Officer

DONALD J. QUIGG

Commissioner of Patents and Trademarks